United States Patent
Gross et al.

(10) Patent No.: US 6,832,566 B2
(45) Date of Patent: Dec. 21, 2004

(54) PROCESS TO IMPROVE THE PERFORMANCE OF THE EXOTHERMIC INCINERATION OF WASTE MATERIAL

(75) Inventors: Gerhard Gross, Wüllich (DE); Otto Lailach, Potsdam (DE)

(73) Assignee: Messer Griesheim GmbH (DE)

( * ) Notice: Subject to any disclaimer, the term of this patent is extended or adjusted under 35 U.S.C. 154(b) by 0 days.

(21) Appl. No.: 10/290,589

(22) Filed: Nov. 8, 2002

(65) Prior Publication Data

US 2004/0011261 A1 Jan. 22, 2004

(30) Foreign Application Priority Data

Nov. 13, 2001 (DE) .......................................... 101 55 811

(51) Int. Cl.[7] ................................................. F23G 5/00
(52) U.S. Cl. ..................................... 110/346; 110/348
(58) Field of Search ................................. 110/348, 346, 110/313, 306, 301, 297; 431/8, 10, 181, 186, 187, 188

(56) References Cited

U.S. PATENT DOCUMENTS

| | | | | |
|---|---|---|---|---|
| 4,655,706 A | * | 4/1987 | Bayh, III | 431/187 |
| 4,957,050 A | * | 9/1990 | Ho | 110/346 |
| 5,188,042 A | * | 2/1993 | Lauwers | 110/346 |
| 5,206,879 A | * | 4/1993 | Moody et al. | 373/22 |
| 5,531,169 A | * | 7/1996 | Mole et al. | 110/346 |
| 6,126,438 A | * | 10/2000 | Joshi et al. | 431/161 |
| 6,174,161 B1 | * | 1/2001 | Slavejkov et al. | 431/159 |
| 6,234,092 B1 | * | 5/2001 | Domschke et al. | 110/238 |

FOREIGN PATENT DOCUMENTS

DE                19722570 A1 * 12/1998 ............. B01J/8/24

* cited by examiner

*Primary Examiner*—Kenneth Rinehart

(57) ABSTRACT

The starting point is a process to improve the performance of the incineration of combustible waste material in an incineration chamber, whereby the waste material is conveyed to a burner flame where it is burned with combustion air at a temperature in the range from 1100° C. to 1700° C. [2012° F. to 3092° F.]. On this basis, in order to create a process that allows a capacity increase of installations employed for the exothermal incineration of waste materials, it is proposed according to the invention that at least part of the combustion air is replaced by an oxygen-rich gas having an oxygen content that is higher than that of air and that the oxygen-rich gas is mixed with a cooling medium.

17 Claims, 1 Drawing Sheet

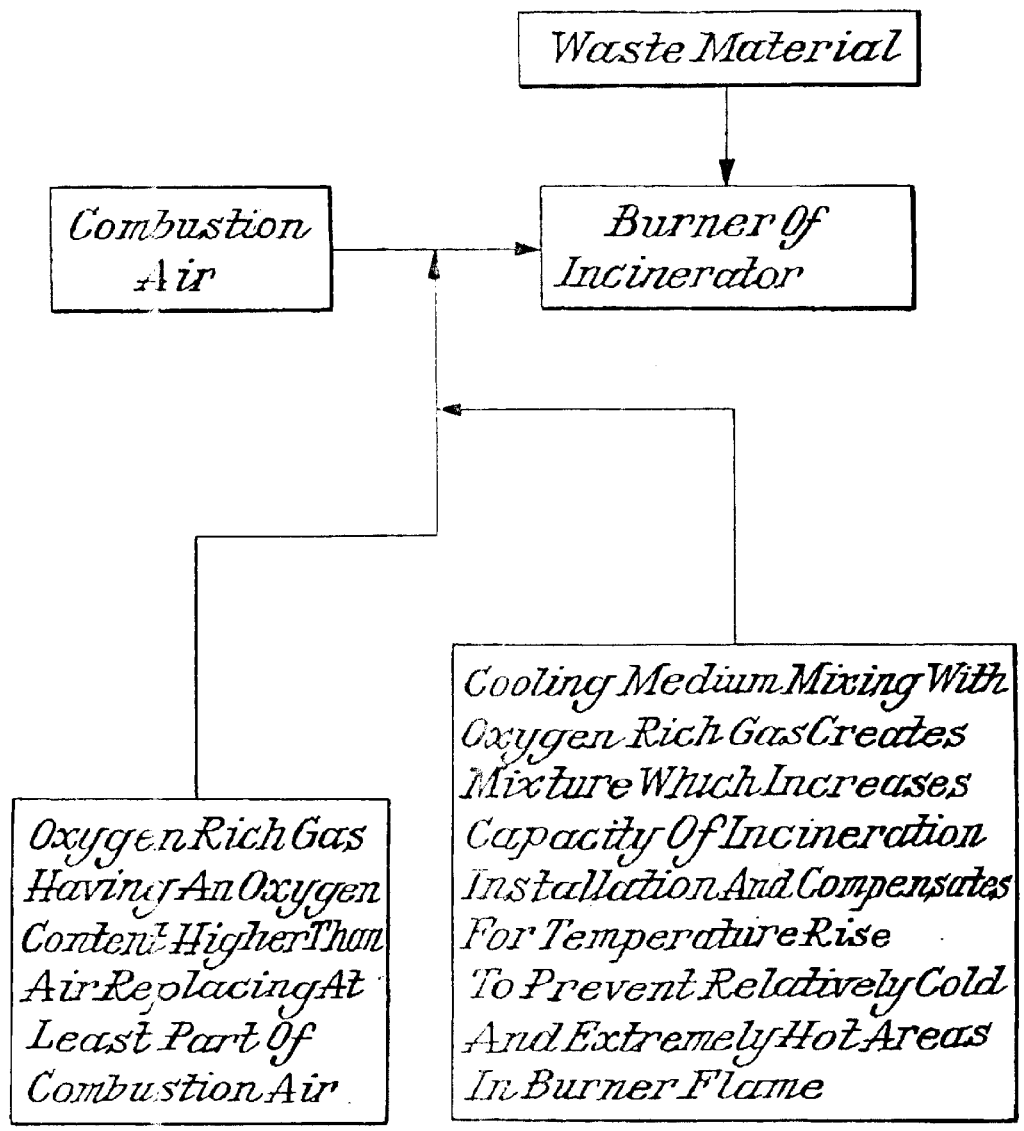

PROCESS TO IMPROVE THE PERFORMANCE OF THE EXOTHERMIC INCINERATION OF WASTE MATERIAL

BACKGROUND OF THE INVENTION

The invention relates to a process to improve the performance of the incineration of combustible waste material in an incineration chamber, whereby the waste material is conveyed to a burner flame where it is burned with combustion air at a temperature within the range from 1100° C. to 1700° C. [2012° F. to 3092° F.].

Waste material that can no longer be reutilized has to be disposed of, if appropriate, by means of incineration. In this process, temperatures within the range from 1100° C. to 1700° C. [2012° F. to 3092° F.] have to be maintained in order to ensure complete incineration. This is particularly true of waste material containing halogens such as spent oil that contains PCB or halogenated hydrocarbons. The costs associated with the incineration installations needed for this purpose are very high, especially in view of the complex equipment for cooling and purifying the reaction gas. This is why efforts are being made to reduce the specific costs in existing installations. In this context, the volumetric flow rate of the reaction gas is usually the limiting parameter.

In the case of endothermic processes such as the thermal cleavage of metal sulfates or waste sulfuric acid, in which the reaction heat has to be generated by additionally supplied burning fuels, methods are known to raise the capacity of the installations by replacing the atmospheric oxygen, at least partially, with pure oxygen. Such a method is described in German application no. DE 197 22 570 (A1).

THE DRAWING

The drawing is a schematic showing of an installation in which the invention would be practiced.

DETAILED DESCRIPTION

The process according to the invention has two essential aspects.

First of all, the capacity of the incineration installation is raised in that an oxygen-rich gas having an oxygen content that is higher than that of air is supplied, said gas completely or partially replacing the combustion air. The capacity increase associated with this—in comparison to the known methods where only air is employed as the oxidant—is essentially based on the fact that the nitrogen fraction in the combustion air that is eliminated as ballast is replaced by additional reaction gases (oxygen, evaporating cooling medium)

The temperature rise associated with this approach is completely or partially compensated for in that the oxygen-rich gas is mixed with a cooling medium. This cooling medium is a fluid. According to the invention, the entire amount of cooling medium, or else part of it, is mixed together with the oxygen-rich gas. This mixing of the oxygen-rich gas with the cooling medium prevents the occurrence of relatively cold and extremely hot areas in the burner flame which would, on the one hand, cause incomplete combustion or, on the other hand, damage the lining of the incineration chamber. Additional energy is withdrawn from the reaction as a result of the evaporation of the cooling medium.

Consequently, the process according to the invention also makes it possible to increase the capacity of an existing incineration installation without the need for complicated retrofitting of the installation—for instance, by adding an especially temperature-stable lining to the incineration chamber.

The term oxygen-containing gas as defined by the invention refers to pure oxygen or to a gas enriched with oxygen having an oxygen fraction of more than 21% by volume.

The oxygen-containing gas is mixed with the cooling medium before the burner flame or in the burner flame. Preferably, however, the oxygen-rich gas is mixed with the cooling medium before the burner flame. This makes it easier to generate a homogenous mixture so that temperature differentials in the burner flame are largely avoided.

Particularly well-suited cooling media as defined by the invention are water or aqueous solutions. As a result of the high evaporation heat of water, energy is withdrawn from the combustion reaction. According to the invention, at least part of the total cooling medium (water or the aqueous solution) is added to the oxygen-rich gas. Part of the cooling medium can also be directly added to the waste material, in contrast to which adding the entire amount of cooling medium to the waste material would be problematic, especially if the latter is not homogenously miscible with water—as is often the case. After all, in such cases, non-homogeneous mixtures can lead to incomplete combustion or can cause damage to the lining of the incineration chamber.

The invention makes it possible to raise the capacity by up to 50% without the occurrence of temperature peaks in the burner flame that would pose a risk to the lining of the furnace and without causing wastewater or exhaust air problems owing to incomplete combustion of the waste material.

Preferably, hydrochloric acid is employed as the cooling medium when waste material containing chlorine is to be incinerated. Here, this can also be contaminated hydrochloric acid. The use of hydrochloric acid as the cooling medium for waste material containing chlorine is convenient since the disposal systems for chlorine are already in place in such cases anyway.

Moreover, the use of water contaminated with organic compounds as the cooling medium has also proven its worth.

When liquid or gaseous waste materials are incinerated, these materials are conveyed into the incineration chamber by means of nozzles or burners. In this context, these waste materials can serve as the carrier medium for part of the cooling medium. For the rest, the cooling medium is preferably injected into the burner flame by means of at least one atomizing nozzle.

The cooling medium is preferably atomized using pneumatic atomizers, a process in which oxygen-rich gas is used as the atomizer gas.

However, for the purposes of the invention, as the atomizer nozzle, it is likewise advantageous to employ a nozzle that generates a stream of drops and that has the form of at least one solid-cone nozzle or at least one flat-spray nozzle and to convey the gas rich oxygen into the stream of drops. In this process, the oxygen-rich gas is preferably conveyed through an annular gap that surrounds the solid-cone nozzle or flat-spray nozzle. The atomizer nozzle or nozzles are advantageously arranged in such a way that the stream of drops saturated with the oxygen-rich gas strikes the burner flame.

In a variant of the process according to the invention, the oxygen-rich gas can be mixed particularly thoroughly with the cooling medium by distributing several atomizer nozzles, each fitted with its own inflow tube, around a central fuel nozzle that is likewise fitted with an inflow tube.

In this context, an additional improvement can be attained when the inflow tubes of the atomizer nozzles form an angle larger than 0°, preferably within the range from 20° to 90°, with the inflow tube of the fuel nozzle. This angle creates a focus in the area of the burner flame and thus a more intense mixing than is the case with nozzles that run parallel. Moreover, this focusing configuration of the inflow tube and the fuel nozzle is also preferred when only one atomizer nozzle is used.

In an approach in which combustion air is fed tangentially into the combustion chamber in order to create a turbulence, preference is given to also feeding the oxygen-rich gas into the combustion chamber tangentially. For this purpose, the atomizer nozzle or nozzles are advantageously arranged not radially, but rather, aligned in such a way that they intensify the turbulence generated by the tangential stream of combustion air. In order to do so, the inflow tubes form an angle ranging from 5° to 45° together with the radii of the air inflow chamber. Here, the atomizer nozzle or nozzles can be additionally tipped with respect to the mid-axis of the combustion chamber.

The cooling medium and the oxygen-rich gas can be fed in by means of an atomizer nozzle. However, it is more advantageous to feed them in by means of several atomizer nozzles, of which only some or all are operated under optimal conditions, depending on the required capacity increase.

According to the invention, it is likewise possible to mix combustion air directly with some of the oxygen fed in for purposes raising the capacity. Moreover, some of the cooling medium can be fed in together with the combustible waste whereby, if the liquids are not miscible, they can be advantageously fed into the furnace in the form of an emulsion.

In addition to the capacity increase for the incineration of liquid or gaseous waste material, the invention also encompasses an increase in the capacity for the incineration of solid waste material. The latter is generally done in rotary tube furnaces. In such a case, the stream of drops of cooling medium generated in the atomizer nozzles, mixed with the oxygen-rich gas, is blown onto the burning material in the area where the waste enters into the furnace.

As shown in the drawing an incineration installation 10 includes an incineration chamber 12. A burner flame is directed into the incineration chamber through a burner 14. Oxygen-rich gas is directed into nozzles 16,16 and mixed with a cooling medium 18,18 so that the mixture is injected into the burner flame. As illustrated there is at least one pneumatic atomizer nozzle 16 which could be a solid cone nozzle or a flat spray nozzle that generates a stream of drops. The oxygen-rich gas is employed as the atomizer gas in the nozzles 16,16 and is conveyed into the stream of drops. Part of the cooling medium may be mixed with the waste gas. The inflow tubes of the atomizer 16,16 are at an angle which is preferably more than 5° and no greater than 45°. Combustion air is fed tangentially through inlet 20. As illustrated the nozzles 16,16 are located so that the are before the burner flame. Slight alteration in the position of the nozzles would result in the mixture of cooling medium and oxygen-rich gas being in the burner flame.

The advantages of the invention will be presented with reference to an application case that is difficult in view of the high combustion temperatures and short retention time, although the invention is not restricted to such cases.

EXAMPLE

The following state of the art served as the basis:

2759 kg/h of chlorinated hydrocarbons having a Cl content of 73% by weight and 200 kg/h of water were fed through a nozzle into a drum-type furnace measuring 2.2 meters in diameter and 4.5 meters in length. Via an inflow chamber, 9000 m$^3$/h (i.N.) of combustion air were blown into the furnace in such a way that the air flowed tangentially around the nozzle. During the combustion reaction, 10,500 m$^3$/h (i.N.) of reaction gases having a temperature of 1570° C. [2858° F.] were generated. These gases contained 12% by volume of HCl, 9.3% by volume of $H_2O$, 11.3% by volume of $CO_2$, 2.9% by volume of $O_2$ and 64.5% by volume of $N_2$. After a retention time in the furnace of approximately 1 second, the gases were quenched and conveyed to the HCl condensation installation.

The limiting parameter for the capacity of the installation is the requisite reaction time at a temperature ranging from 1500° C. to 1800° C. [2732° F. to 3272° F.] and thus the volumetric flow rate of the reaction gas.

In order to raise the capacity of this installation, six connection pieces were welded into the inflow chamber through which the six pneumatic atomizer nozzles projected into the inflow chamber in such a way that the nozzles formed a crown around the central fuel nozzle and 6 cm behind it. The inflow tubes of the burner nozzle and of the atomizer nozzles formed an angle of 60°. Relative to the radius, the inflow tubes formed an angle of 20° in the direction in which the combustion air was fed in tangentially.

The waste incineration at the beginning of the experiment was carried out in the above-mentioned manner. With a stationary operation at an incineration temperature of 1570° C. [2858° F.], the pneumatic atomizer nozzles were operated one after the other and the feeds of waste and combustion air were adjusted in increments. The following settings for the operating parameters were obtained in the target state with an increased capacity:

A total of 3300 kg/h of waste was fed in via the fuel nozzle. The feed of combustion air was reduced from 9000 m$^3$/h to 5400 m$^3$/h (i.N.). Using the six atomizer nozzles, a total of 1730 L/h of water was injected into the flame along with 1000 m$^3$/h (i.N.) of oxygen. The temperature of the combustion gases could be kept within the range from 1550° C. to 1580° C. [2822° F. to 2876° F.]. The volumetric flow rate of the reaction gas remained constant at 10,500 m$^3$/h (i.N.). The reaction gas contained 14.4% by volume of HCl, 28.8% by volume of $H_2O$, 13.8% by volume of $CO_2$, 2.9% by volume of $O_2$ and 40.2% by volume of $N_2$. The analysis of the condensed hydrochloric acid confirmed the complete incineration of the waste.

The capacity of the incineration installation was increased by 20% through the use of $O_2$ while concurrently reducing the volume of waste gas by 28%.

What is claimed is:

1. A process to improve the performance of the exothermic incineration of combustible waste material in an incineration chamber, whereby the waste material is conveyed to a burner flame where it is burned with combustion air at a temperature in the range from 1100° C. to 1700° C., characterized in that at least part of the combustion air is replaced by an oxygen-rich gas having an oxygen content that is higher than that of air, and in that the oxygen-rich gas is mixed with a cooling medium, the mixture of oxygen-rich gas and cooling medium increasing the capacity of the incineration installation, and the mixture compensating for temperature rise to prevent relatively cold and extremely hot areas in the burner flame.

2. The process according to claim 1, characterized in that the oxygen-rich gas is mixed with the cooling medium before the burner flame.

3. The process according to claim 1, characterized in that water or an aqueous solution is employed as the cooling medium.

4. The process according to claim 3, characterized in that hydrochloric acid is employed as the cooling medium.

5. The process according to claim 3, characterized in that water contaminated with organic compounds is employed as the aqueous solution.

6. The process according to claim 1, characterized in that the cooling medium is injected into the burner flame by means of at least one atomizer nozzle.

7. The process according to claim 6, characterized in that a pneumatic atomizer nozzle is employed as the atomizer nozzle and the oxygen-rich gas is employed as the atomizer gas.

8. The process according to claim 6, characterized in that a nozzle in the form of a solid-cone nozzle or a flat-spray nozzle that generates a stream of drops is employed as the atomizer nozzle and the oxygen-rich gas is conveyed into the stream of drops.

9. The process according to claim 1, characterized in that several atomizer nozzles, each having an inflow tube, are distributed around a central fuel nozzle having an inflow tube.

10. The process according to claim 9, characterized in that, together with the air inflow tube of the fuel nozzle, the inflow tubes of the atomizer nozzles form an angle greater than 0°.

11. The process according to claim 10, characterized in that, together with the radii of the air inflow chamber, the inflow tubes of the atomizer nozzles form an angle ranging from 5° to 45°.

12. The process according to claim 9, characterized in that, together with the radii of the air inflow chamber, the inflow tubes of the atomizer nozzles form an angle ranging from 5° to 45°.

13. A process to improve the performance of the incineration of combustible waste material in an incineration chamber, whereby the waste material is conveyed to a burner flame where it is burned with combustion air at a temperature in the range from 1100° C. to 1700° C., characterized in that at least part of the combustion air is replaced by an oxygen-rich gas having an oxygen content that is higher than that of air, and in that the oxygen-rich gas is mixed with a cooling medium, and further characterized in that the oxygen-rich gas is mixed with the combustion air.

14. The process according to claim 1, characterized in that part of the cooling medium is mixed with the waste material.

15. The process according to claim 1, characterized in that the process takes place in a drum-type furnace.

16. The process according to claim 2, characterized in that the process takes place in a rotary tube furnace.

17. The process according to claim 10, characterized in that the angle is within the range of 20° to 90°.

* * * * *